United States Patent [19]

Seward et al.

[11] 4,419,377

[45] Dec. 6, 1983

[54] CAKE MIX CONTAINING A LIPOPHILIC EMULSIFIER SYSTEM

[75] Inventors: Larry O. Seward; Bradley Warman, both of Cincinnati, Ohio

[73] Assignee: The Procter & Gamble Company, Cincinnati, Ohio

[21] Appl. No.: 360,756

[22] Filed: Mar. 22, 1982

[51] Int. Cl.$^3$ .............................................. A21D 2/16
[52] U.S. Cl. ..................................... 426/554; 426/553
[58] Field of Search ................................ 426/552–555, 426/653, 654, 241, 243, 234, 611

[56] References Cited

U.S. PATENT DOCUMENTS

| | | | |
|---|---|---|---|
| 2,132,395 | 10/1938 | Coith et al. | 426/554 |
| 2,132,417 | 10/1938 | Harris | 426/552 |
| 2,132,436 | 10/1938 | Reynolds et al. | 426/331 |
| 3,034,897 | 5/1962 | Kuhrt et al. | 426/24 |
| 3,098,748 | 7/1963 | Noznick et al. | 426/98 |
| 3,145,110 | 8/1964 | Abbott | 426/611 |
| 3,230,090 | 1/1966 | Weiss | 426/611 |
| 3,268,338 | 8/1966 | Strobel | 260/410.6 |
| 3,434,848 | 3/1969 | Katz | 426/564 |
| 3,479,189 | 11/1969 | Vrang et al. | 426/653 |
| 3,574,637 | 4/1971 | Andre | 426/554 |
| 3,582,357 | 3/1971 | Katz | 426/564 |
| 3,637,774 | 1/1972 | Babayan et al. | 521/172 |
| 3,914,453 | 10/1975 | Gawrilow | 426/553 |
| 4,242,366 | 12/1980 | Morgan et al. | 426/554 |

FOREIGN PATENT DOCUMENTS 1042261 11/1978 Canada ............................ 426/555

OTHER PUBLICATIONS

Painter, *J. Am. Oil Chem. Soc.*, 92, (Feb. 1981).
Wootton et al., *Cereal Chemistry*, 44, 333, (1967).
Birnbaum, *Baker's Digest*, 52, 28, (1978).

*Primary Examiner*—Raymond N. Jones
*Assistant Examiner*—Elizabeth A. Hatcher
*Attorney, Agent, or Firm*—Rose Ann Dabek; Julius P. Filcik; Richard C. Witte

[57] ABSTRACT

A culinary mix for use in preparing baked goods is disclosed. This mix utilizes a lipophilic emulsifier system, and a high level of leavening. This enables the consumer to bake a cake using microwave radiant energy which is comparable in structure, moistness and taste to that baked in a convection oven. The lipophilic emulsifier system comprises propylene glycol monoesters, monoglycerides, glycerolacto esters, and polyglycerol esters.

12 Claims, No Drawings

CAKE MIX CONTAINING A LIPOPHILIC EMULSIFIER SYSTEM

TECHNICAL FIELD

The invention relates to prepared culinary mixes for making baked goods using microwave radiant energy.

BACKGROUND OF PRIOR ART

The use of prepared mixes has greatly simplified the task of preparing baked goods, in particular cakes. These baked goods contain flour, sugar, shortening, leavening and other minor ingredients. To prepare them the consumer adds water, oil and eggs to the mix and forms a homogeneous batter.

When culinary mixes designed for baking in a conventional oven, that is, one using radiant heat, are baked in the microwave oven, a dry, tough, unacceptable cake is produced. When the cake batter is baked in the microwave using a square pan, the outer edges become dry and tough and the center is not completely baked. Even when a round pan is used and the cake is elevated from the lower surface of the microwave oven, a dry, tough cake is still produced. Various methods have been used to compensate for the uneven baking in the microwave oven such as frequent turning of the pan, using tube pans, yet none of these provides a suitable way to prepare a moist, light, high cake using microwave radiant energy as the energy source.

The addition of extra water or extra oil to the cake batter compensates somewhat for the dry tough nature, but the cake becomes unacceptably dense, small and collapsed.

It has now been found that a cake formula that gives decidedly better results than a microwave oven baked cake from commercial cake mixes can be produced if the following conditions are met. The emulsifier system must be a lipophilic emulsifier system present in an amount of from 10% to about 100% of the shortening, and the leavening system must be considerably higher in level than that used in current commercial mixes.

The lipophilic emulsifier system consists essentially of:
1. 13% to 68% monoglycerides;
2. 10% to 55% propylene glycol monoesters;
3. 4% to 40% polyglycerol esters; and
4. 5% to 42% lactylated monoglycerides and/or lactylated propylene glycol esters or mixtures thereof.

The leavening system comprises a combination of leavening acids such as sodium aluminum phosphate, monocalcium phosphate, and dicalcium phosphate with baking soda. The levels are from 2% to about 10% of the total mix.

Accordingly, an object of this invention is to provide packaged culinary mixes which can be made into baked goods which are more tender, have better eating qualities and better appearance than products made from conventional mixes in the microwave oven.

It is a further object of this invention to provide a packaged culinary mix which produces a cake which is equivalent in eating quality to that prepared using radiant energy in moistness, lightness and tenderness.

Other objects and advantages and features will be apparent from the following detailed description.

Unless otherwise noted all percentages are on a per weight basis.

BRIEF SUMMARY OF INVENTION

A culinary mix, comprising:
a. from about 30% to about 54% sugar and from about 22% to about 43% flour, the ratio of sugar to flour being from about 1:1 to about 1.7:1;
b. from about 2% to about 10% leavening, said leavening consisting of a blend of baking acid and baking soda which when fully reacted should evolve from about 40 mmoles/lb mix to about 195 mmoles/lb of mix of carbon dioxide;
c. from about 6% to about 17% shortening, said shortening comprising:
  i. 0% to about 90% oil or fat;
  ii. 10% to about 100% of an emulsifier consisting essentially of monoglycerides, propylene glycol monoesters, polyglycerol esters, and lactylated monoglycerides or lactylated propylene glycol esters;
d. the balance being being conventional cake additives.

When water and eggs are added to this dry mix, a batter is formed which can be baked in the microwave oven to produce a moist, tender, consumer-acceptable cake.

The Shortening System

By "shortening" or "shortening system" herein is meant a fat or oil or mixtures of fats and/or oils to which the emulsifiers have been added.

The fats or oils suitable for use herein can be plastic or fluid; however, a major part of the shortening system is a liquid oil. The oil portion of the shortening can be derived from naturally occurring liquid triglyceride oils such as cottonseed oil, soybean oil, peanut oil, rapeseed oil, sesame oil, coconut oil, corn oil, and sunflower seed oil. Also suitable are the liquid oil fractions obtained from palm oil, lard and tallow, as for example by graining or directed interesterification, followed by separation of the oils. Those predominating in glycerides of unsaturated fatty acids may require some hydrogenation to maintain flavor.

Mixtures of the above oils or other oils can also be used herein as can solid fatty materials, such as saturated triglyceride fats. In general, from about 1.5% to about 25% of triglycerides which are solid at 70° F. can be added to a liquid oil.

Fish oils such as herring, menhaden and whale oil can also be used herein.

The preferred oils are soybean oil hydrogenated to an iodine value of from about 105 to 115, preferably about 107, corn oil, palm oil, hydrogenated palm oil, cottonseed oil, lard and tallow oils. Preferably the oils used to prepare the shortening composition will contain only from about 0% to about 14% hardstock. Hardstock is a hydrogenated fat or oil having an iodine value of 8 or less.

Preferably, the shortening should be from 40% to 60% emulsifier. The preferred emulsifier consists of from 33% to 43% mono- and diglycerides, from 35% to 45% propylene glycol monoesters, from 8% to 15% polyglycerol esters, and from 10% to 16% lactylated mono- and diglycerides.

The propylene glycol monoesters used herein are those esters of 1,2-propylene glycol and fatty acids having from about 14 to about 22 carbon atoms. Preferred for use herein are propylene glycol esters having a total monoester level of at least seventy (70%) percent. The preferred propylene glycol monoesters are propylene glycol monopalmitate and propylene glycol monostearate.

The fatty acids used to esterify the propylene glycol can be saturated or trans-unsaturated carboxylic acid radicals having 14, 16, 18, 20 or 22 carbon atoms. A small amount of cis-unsaturated carboxylic acids can be present. Examples of suitable fatty acids are myristic, palmitic, margaric, stearic, arachidic, behenate, elaidic, and brassidic acids.

The polyglycerol esters have an average of four to nine glycerol units per polyglycerol moiety, and preferably about six glycerol units per polyglycerol moiety. This polymerized polyglycerol is esterified with fatty acids having from about 14 to about 22 carbon atoms. The same fatty acids used to esterify the propylene glycol can be used for the polyglycerol esterification.

Preferably, the fatty acid will consist of a mixture of palmitic and stearic acids. The preferred ratio of palmitic to stearic acid is in the range of 2:3 to 7:3 ($C_{16}$:$C_{18}$). The hydrophilic, lipophilic balance of the polyglycerol ester is controlled by the ratio of the polyglycerol to fatty acid. This ratio can vary from 45:55 to 62:38. The preferred polyglycerol to fatty acid ratio is between 55:45 to 61:39.

Preferably, the polyglycerol used to prepare the polyglycerol esters of this shortening system has the following distribution:

| Component | Percent |
| --- | --- |
| Free glycerol | 4.3–10.7 |
| Cyclic diglycerol | 6.7–9.9 |
| Linear diglycerol | 11.4–17.4 |
| Cyclic triglycerol | 3.7–6.9 |
| Linear triglycerol | 9.7–13.3 |
| Cyclic tetraglycerol | 2.5–4.2 |
| Linear tetraglycerol | 7.2–10.4 |
| Pentaglycerol | 8.9–11.3 |
| Hexaglycerol | 7.5–9.9 |
| Heptaglycerol | 6.1–8.1 |
| Octaglycerol | 4.8–6.4 |
| Nonaglycerol | 2.8–5.8 |
| Decaglycerol | 1.6–2.6 |
| Undecaglycerol | 0–3.1 |
| Dodecaglycerol | 0–0.8 |

By "lactylated mono- and diglycerides" are meant lactic acid esters of mono- and diglycerides of fatty acids having from about 14 to 22 carbon atoms, in which from 10% to 35% are the hydroxyls of the glycerides are esterified with lactic acid or polymers of lactic acid. Preferred for use herein is the lactylated monoglyceride of soybean hardstock.

By lactylated propylene glycol esters herein are meant lactic acid esters of monoesters of propylene glycol and fatty acids having from about 14 to 22 carbon atoms, in which the remaining hydroxyl is esterified with lactic acid or polymers of lactic acid.

By mono- and diglycerides herein are meant the mono- and diglycerides of fatty acids having from about 14 to 22 carbon atoms. Preferred for use herein are distilled monoglycerides which represent monoglycerides having a higher proportion of monoglycerides than di- and triglycerides.

The fatty acids used to esterify the monoglycerides and the lactylated mono- and diglycerides are selected from the same group as those to esterify the propylene glycol monoesters and the polyglycerol esters.

To prepare the shortening system, the emulsifiers are melted and added to the oil or fat at a temperature above the melting point of the emulsifier to insure a homogeneous blend. The emulsifiers are usually added to the fat or oil. The propylene glycol monoesters aid the blending of the polyglycerol esters to the shortening system.

Alternatively the emulsifiers can be melted and added separately to the oils. The propylene glycol must be added first since it is necessary to solubilize or disperse the polyglycerol esters into the fat or oil.

Functionality of the Emulsifier System

To illustrate the need for all four emulsifiers in the prescribed ratios, two cakes were prepared. One contained the emulsifer system described in U.S. Pat. No. 4,242,366 issued on Dec. 30, 1980 to Morgan et al. The other contained the emulsifier system of this invention. The other ingredients were the same. The baking time and baking containers were identical as were the methods used to prepared the mixes and batters.

| Shortening | '366 Patent | This Invention |
| --- | --- | --- |
| Oil | 59.2% | 55.0% |
| Monoglyceride | 1.4%* | 17.0% |
| Lactylated mono- and diglycerides | 20.4%** | 5.6% |
| Propylene glycol monoesters | 19.0%*** | 18% |
| Polyglycerol ester |  | 4.4% |

*EC-25 from Durkee
**DurLac 100W from Durkee
***DurPro 107 from Durkee
Note:
The above shortening utilizes a "component blend" as defined in the '366 patent consisting of 61% propylene glycol monoester, 24% monoglyceride, and 15% lactylated mono- and diglyceride.

The cake prepared from the shortening of the '366 was tough and dry. The grain was uneven. The cake prepared from the shortening of this invention was light, moist and had an even grain and good texture.

When the emulsifier system of the '366 patent is used with the conventional leavening system illustrated in the '366 patent, and the cake is baked in the microwave oven, a cake having a collapsed structure is prepared.

The Leavening System

The leavening system is comprised of a baking soda and a baking acid. The baking soda can be potassium, sodium or ammonium carbonate. The baking or leavening acid is a material such as sodium aluminum phosphate, monocalcium phosphate or dicalcium phosphate. Mixtures of leavening acids can be used. Preferred for use herein is a mixture of monocalcium phosphate, sodium aluminum phosphate, and dicalcium phosphate.

The amount of carbon dioxide evolved from the baking soda is based on the amount of carbonate neutralized by the leavening acid. The carbon dioxide is partially responsible for height of the cake. The air emulsified within the batter also contributes to the final cake height.

The amount of carbon dioxide evolved by the leavening system is based on the amount of baking soda neutralized by the acid. This can be calculated from the neutralization value of each of the leavening acids in the system through techniques known in the art. The leavening system should produce from about 40 millimoles per pound of mix to about 195 millimoles per pound (mm/lb) of mix of carbon dioxide. Preferably from about 70 mm/lb to about 107 mm/lb of carbon dioxide will be evolved.

The ratio of soda to the leavening acid as well as the balance between fast and slow acting acids depends somewhat upon the flavor the cake mix. Some degree of fast and slow acting baking acid is preferred to give the proper gas evolution and pH profile during baking. The ratio of soda to acid controls the pH of the batter; the desired pH will depend upon the flavor of the cake.

Preferably, the amount of baking soda comprises from about 1% to about 4% of the mix. The amount of sodium aluminum phosphate comprises from about 0.1% to about 1%, the amount of dicalcium phosphate is about 0.3% to about 6% of the mix and the amount of monocalcium phosphate is from about 0.1% to about 1% of the total mix.

The baking time in a microwave oven is considerably less than that in a conventional oven (8–11 min. v. 35–45 min.). Thus the leavening system must be adjusted for this time differential. The microwave radiant energy also causes the starch to gel faster than in a conventional oven. This must be taken into account when adjusting the leavening.

The Culinary Mix

A culinary mix comprising:

A. from about 30% to about 54% sugar and from about 22% to about 43% flour, the ratio of sugar:-flour being from about 1:1 to about 1.7:1;

B. from about 2% to about 10% leavening, said leavening consisting of a blend of baking acid and baking soda which when fully reacted should evolve from about 40 mm/lb mix to about 195 mm/lb of mix of carbon dioxide;

C. from about 6% to about 17% shortening;

D. the balance being conventional cake additives.

The ordinary granulated sugars are quite satisfactory for use herein. These include sucrose, dextrose, maltose, fructose, lactose, brown and invert sugars, alone or in combination. The ratio of sugar to flour should be in the range of about 1:1 to about 1.7:1, preferably from about 1.2:1 to about 1.6:1.

The flour can be the usual bleached cake flour, although a general-purpose flour can be substituted. Flours which have been treated in other manners to produce flours of the quality of bleached cake flour are also acceptable. Flour can be enriched with additional vitamins and minerals.

The sugar and flour are preferably co-milled using the process described in commonly assigned U.S. Pat. No. 3,694,230 issued to Cooke, 1972, which disclosure is incorporated in its entirety by reference herein.

The preferred shortening level is from 8.5% to 10.5% of the finished mix. The shortening is preferably first combined with the sugar and flour mixture using a high speed rotary mixer. This mixture of sugar, flour and shortening is then combined with other conventional cake additives to produce the finished mix.

The term "conventional cake additives" includes ingredients such as flavors, thickeners, nutrients, antioxidants, and antimicrobial agents, non-fat milk solids, egg solids, and whey proteins.

Suitable hydrophilic colloids can include natural gum materials such as gum tragacanth, locust bean gum, algin, gelatin, Irish moss, pectic and gum arabic. Synthetic gums such as water-soluble salts of carboxymethyl cellulose can also be used.

Non-fat milk solids which can be used herein are the solids of skim milk and can include proteins, mineral matter and milk sugar. Other proteins such as casein, sodium caseinate, calcium caseinate, modified casein, sweet dairy whey, modified whey, and whey protein concentrate can also be used herein. Generally these solids will be used from about 0% to about 5% of the weight of the dry mix.

For many culinary mixes it is accepted practice for the user to add the required amount of eggs in the course of preparation. This practice may be followed just as well with the present mixes. If desired, the inclusion of egg solids, in particular egg albumin and dried yolk, in the mix are allowable alternatives. Soy isolates, whey protein concentrates, and other egg substitutes may be used in the place of the egg solids.

Dry or liquid flavoring agents can also be added to the mix. These include cocoa, vanilla, chocolate flavors, coconut, peppermint, pineapple, cherry, nuts, spices, salts, flavor enhancers, among others. Any suitable flavoring agent used to prepare baked goods can also be used herein.

To produce a cake mix, the shortening system is prepared as described in the preceding section. The flour, sugar, leavening agent, emulsified shortening, and additional ingredients are then mixed together in a conventional manner to produce the cake mix. For example, the emulsified shortening and other ingredients can be combined with the sugar, flour or co-milled sugar/flour mixture by admixing these components in a planetary bowl mixer, a ribbon blender, a high-speed rotary mixer, or in other conventional mixers. Preferably, however, the shortening containing the emulsifier is first mixed with the sugar and flour mixture in a high speed rotary mixer to form an essential homogeneous sugar/flour/shortening blend. Then the additional ingredients are admixed with this blend.

To prepare a batter from this mix, the following ingredients are added: for an average 100 g of batter, from 20 g to 40 g of water; from 40 g to 60 g mix; from 8 g to 25 g of egg; from 0 g to 15 g of oil. The batter is then mixed to make a homogeneous blend and to incorporate air.

The batter resulting from this mixing process is poured into a cake pan suitable for use in baking in the microwave oven. The preferred pan for baking the particular cake herein in the microwave is a mixing bowl which has a rounded bottom and sides. Round pans, 8-inch × 13-inch rectangular pans, tube pans as well as other types of pans can be used.

Several bands of frequency are available for microwave cooking. These frequencies are in the range of 900 megacycles, 2400 megacycles, 5700 megacycles and 3300 megacycles. It is preferable to use microwave frequencies of 2450±1000 megacycles for baking the cakes herein.

The exact cooking time will depend upon the frequency of the microwave energy and the amount of batter.

EXAMPLE I

Shortening

| Ingredient | Percent |
| --- | --- |
| Monoglyceride* | 17 |
| Propylene glycol monoesters of palm oil | 18 |

-continued

| Ingredient | Percent |
| --- | --- |
| Lactic acid esters of monoglyceride | 5.6 |
| polyglycerol ester** | 4.4 |
| Soybean oil (I-107) | 55 |

*Myverol 18-04
**polyglycerol ester of stearic and palmitic acid having an average of six glycerol units

| Mix Ingredients: Ingredient | Percent |
| --- | --- |
| Sugar | 41 |
| Flour | 31 |
| Shortening | 10.3 |
| Monocalcium phosphate | 0.7 |
| Sodium aluminum phosphate | 0.15 |
| Soda | 1.7 |
| Dicalcium phosphate | 0.3 |
| Gum | 0.2 |
| Salt | 0.6 |
| Starch | 5.2 |
| Cocoa | 8.3 |
| Flavors | Remainder |

The shortening is prepared by warming the oil to a temperature of about 175° F. The emulsifier blend is added to this shortening. The sugar and flour are co-milled as described in the Cooke patent, U.S. Pat. No. 3,694,230. The co-milled sugar and flour are then added with the shortening and the remaining ingredients in a ribbon blender.

The dry mix (460 g) is then mixed with 144 g eggs, 55 g oil, and 320 g water to make a batter. The mixing time is for 2 minutes at 850 rpm with a portable mixer. The batter has a density of 0.85 g/cc and a viscosity of 5800 cp (at 70° F.). The batter is then baked in a Pyrex bowl for 11½ minutes using 500 watts power.

The cake having a good grain and texture is prepared.

EXAMPLE II

A cake mix is prepared using the following ingredients:

| Ingredients | Percent |
| --- | --- |
| Sugar | 49 |
| Flour | 29.6 |
| Shortening* | 9.8 |
| Starch | 7.3 |
| Monocalcium phosphate | 0.81 |
| Sodium aluminum phosphate | 0.4 |
| Soda | 1.3 |
| Dicalcium phosphate | 0.6 |
| Gum | 0.3 |
| Colors and flavors | Remainder |

*As in Example I

The cake mix and shortening are prepared as in Example I. When this is made into a batter using 445 g of mix, 144 g eggs, 73 g oil and 240 g water, the batter has a viscosity of 10800 cp (at 70° F.) and a density of 0.835 g/cc. When this cake is baked in a microwave oven using 494 watts for 10 minutes it produces a cake mix with an even and smooth grain.

What is claimed is:

1. A culinary mix comprising:
   (a) from about 30% to about 54% sugar and 22% to about 43% flour, the ratio of sugar to flour being from about 1:1 to about 1.7:1;
   (b) leavening sufficient to produce from about 40 mm/lb to 195 mm/lb of carbon dioxide;
   (c) from about 6% to about 17% shortening, said shortening comprising:
      (i) 0% to about 90% oil or fat;
      (ii) 10% to about 100% of an emulsifier consisting essentially of 13% to 68% monoglycerides, 10% to 55% propylene glycol monoesters, 4% to 40% polyglycerol esters, and 5% to 42% lactylated propylene glycol monoester or lactylated monoglycerides;
   (d) the balance being conventional cake additives.

2. A mix according to claim 1 wherein the emulsifier consists essentially of mixtures of propylene glycol monopalmitate, propylene glycol monostearate, polyglycerol esters of palmitic and stearic acid, lactylated monoglycerides of soybean and mono- and diglycerides of soybean and palm oil.

3. A mix according to claim 2 wherein the shortening consists of 40% to 60% emulsifier.

4. A mix according to claim 3 wherein the emulsifier consists of from 33% to 43% mono- and diglycerides, from 35% to 45% propylene glycol monoesters, from 8% to 15% polyglycerol esters, and from 10% to 16% lactylated mono- and diglycerides.

5. A mix according to claim 4 wherein the sugar to flour ratio is from about 1.3:1 to about 1.6:1.

6. A mix according to claim 5 wherein the shortening level is from 8.5% to 10.5% of the finished mix.

7. A mix according to claim 6 wherein the leavening system evolves from 70 mm/lb to 107 mm/lb of mix of carbon dioxide gas.

8. A mix according to claim 7 wherein the shortening contains from about 0% to about 5% hardstock.

9. A mix according to claim 8 wherein the emulsifier of said shortening consists essentially of mixtures of palmitic and stearic acid esters of polyglycerols having an average of 6 glycerol units per polyglycerol moiety.

10. A mix according to claim 9 wherein the oil has an Iodine value of between 100 and 115.

11. A mix according to claim 10 wherein the oil is soybean oil hydrgenated to an Iodine Value of 107.

12. A cake batter comprising:
   (a) from about 40% to about 60% of a mix according to claim 1;
   (b) from about 20% to about 40% water;
   (c) from about 8% to about 25% eggs;
   (d) from about 0% to about 15% oil.

* * * * *